(12) United States Patent
Kang et al.

(10) Patent No.: US 8,166,504 B2
(45) Date of Patent: Apr. 24, 2012

(54) METHOD AND APPARATUS FOR PROCESSING CONTENT IN HOME NETWORK USING TV CHANNELS

(75) Inventors: Eun-jung Kang, Suwon-si (KR); Jung-yon Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 11/585,161

(22) Filed: Oct. 24, 2006

(65) Prior Publication Data

US 2007/0186270 A1 Aug. 9, 2007

(30) Foreign Application Priority Data

Feb. 7, 2006 (KR) .................. 10-2006-0011780

(51) Int. Cl.
*G06F 3/00* (2006.01)
*G06F 13/00* (2006.01)
*H04N 5/445* (2006.01)
*H04N 7/18* (2006.01)
*H04N 7/173* (2011.01)

(52) U.S. Cl. ............ 725/48; 725/37; 725/44; 725/47; 725/49; 725/88

(58) Field of Classification Search .......... 725/44
See application file for complete search history.

(56) References Cited

U.S. PATENT DOCUMENTS

| | | | | |
|---|---|---|---|---|
| 5,721,829 A | * | 2/1998 | Dunn et al. ............... | 725/87 |
| 6,133,910 A | * | 10/2000 | Stinebruner ............... | 725/49 |
| 6,144,376 A | * | 11/2000 | Connelly ............... | 725/44 |
| 6,985,190 B1 | * | 1/2006 | Klopfenstein et al. ........ | 348/569 |
| 7,155,415 B2 | * | 12/2006 | Russell et al. ............... | 705/59 |
| 7,516,470 B2 | * | 4/2009 | Russ et al. ............... | 725/48 |
| 2004/0260730 A1 | | 12/2004 | Iwama | |
| 2006/0037051 A1 | * | 2/2006 | McDowell et al. ........... | 725/80 |
| 2006/0064720 A1 | * | 3/2006 | Istvan et al. ............... | 725/38 |
| 2006/0218581 A1 | * | 9/2006 | Ostrowska et al. ........... | 725/38 |
| 2006/0218608 A1 | * | 9/2006 | Miura et al. ............... | 725/105 |
| 2006/0290814 A1 | * | 12/2006 | Walter ............... | 348/554 |

FOREIGN PATENT DOCUMENTS

| | | |
|---|---|---|
| JP | 2005-123884 A | 5/2005 |
| KR | 10-2001-0009630 A | 2/2001 |
| KR | 2001-0107623 A | 12/2001 |
| KR | 2002-0047218 A | 6/2002 |
| WO | WO 02/13463 A2 | 2/2002 |
| WO | 2005/066822 A1 | 7/2005 |

OTHER PUBLICATIONS

Communication dated Jan. 6, 2012, issued by the State Intellectual Property Office of the People's Republic of China in counterpart Chinese Patent Application No. 200710001574.0.

* cited by examiner

*Primary Examiner* — Justin Shepard
(74) *Attorney, Agent, or Firm* — Sughrue Mion, PLLC

(57) ABSTRACT

A content processing method and apparatus which can maximize user convenience by allocating content available in a home network to an empty TV channel are provided. The content processing method includes storing channel information regarding a plurality of broadcast channels to which a broadcast signal has been set, storing channel information regarding a plurality of empty channels to which no broadcast signal has been set, issuing a request for a content list to and receiving a content list from one of a plurality of server devices connected to a home network, mapping the content list to a plurality of empty channels, and selecting one of the channels to which the content list is mapped, and playing back content included in the selected channel.

14 Claims, 4 Drawing Sheets

METHOD AND APPARATUS FOR PROCESSING CONTENT IN HOME NETWORK USING TV CHANNELS

CROSS-REFERENCE TO RELATED PATENT APPLICATION

This application claims priority from Korean Patent Application No. 10-2006-0011780, filed on Feb. 7, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to home network systems, and more particularly, to processing content which can maximize user convenience by allocating content available in a home network to an empty television (TV) channel.

2. Description of the Related Art

In general, a home networking environment is an environment where a variety of home information devices such as personal computers, televisions (TV), and server devices are linked together in a network and can thus share digital data and provide broadband communication.

A plurality of audio/video (A/V) devices connected to a home network may include a server, which provides a plurality of contents and a player which plays back the contents. A TV, which can act as a media player in such a home network, plays back a plurality of contents provided by a media server. When a user presses a channel up/down button of the TV, and when an automatic channel function is set in the TV, then the TV displays a channel that is memorized as a subsequent channel with respect to a channel to which the TV is currently set (hereinafter referred to as "the current channel"). On the other hand, when the user presses the channel up/down button when the automatic channel function is not set in the TV, the TV displays a channel that is one channel higher or lower than the current channel. A TV having a Universal Plug & Play (UPnP) control point (CP) function can provide a user with a content list including all contents provided by a server device in a home network, other than the TV. In this case, the TV includes a graphic user interface, which operates in response to user input made using a menu button. A content list of the server device is transmitted through a UPnP content directory service (CDS). Content provided by the server device includes Uniform Resource Locator (URL) information, and thus, the TV streams and plays back the content with reference to the URL information.

In order to play back content provided by a media server, a TV that can act as a media player in a home network must display a content list as an additional menu screen and must allow the user to choose desired content from the content list using a plurality of buttons on a remote control. This type of menu method, however, causes inconvenience to a user who is unfamiliar with the use of a user interface (UI).

SUMMARY OF THE INVENTION

An aspect of the present invention provides a content processing method for use in a home network system in which content that is provided by a server, and is thus currently available in a home network, is allocated to an empty channel to which no broadcast signal is allocated so that the content can be readily played back when a user tunes in to the corresponding channel using a channel button.

An aspect of the present invention also provides a content processing apparatus which allocates content that is provided by a server, and is thus currently available in a home network, to an empty channel to which no broadcast signal is allocated.

According to an aspect of the present invention, there is provided a content processing method used by a playback device. The content processing method includes storing channel information regarding a plurality of broadcast channels to which a broadcast signal has been set and channel information regarding a plurality of empty channels to which no broadcast signal has been set, issuing a request for a content list to and receiving a content list from one of a plurality of server devices connected to a home network, mapping the content list to a plurality of empty channels, and choosing one of the channels to which the content list is mapped, and playing back content included in the chosen channel.

According to another aspect of the present invention, there is provided a content processing apparatus for processing a plurality of contents provided by a plurality of devices in a home network. The content processing apparatus includes a channel storage unit which stores information regarding a plurality of broadcast channels having a broadcast signal and information regarding a plurality of empty channels having no broadcast signal by automatic channel setting, a mapping data storage unit which stores mapping information regarding the mapping relationship between a content list and a plurality of empty channels, and a control unit which issues a request for a content list to and receives a content list from one of a plurality of server devices in a home network, maps the received content list to a plurality of empty channels whose information is stored in the channel storage unit, and, when one of the channels to which the received content list is mapped is chosen, plays back content corresponding to the chosen channel.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 1:
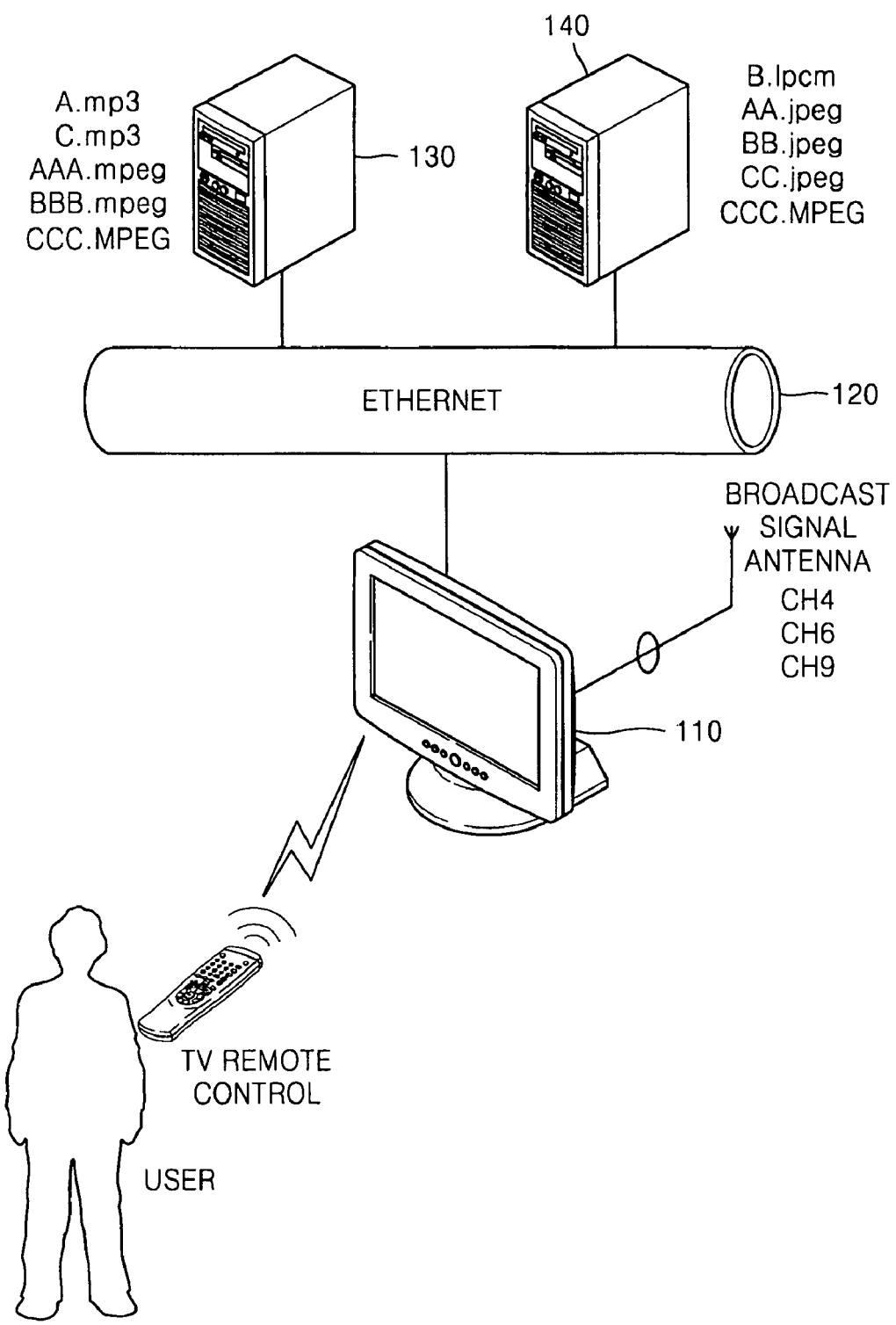
FIG. 1 is a diagram illustrating a Home network system according to an exemplary embodiment of the present invention.

FIG. 1 is a diagram illustrating a home network system according to an exemplary embodiment of the present invention. Referring to FIG. 1, the home network system includes a first server 130, a second server 140, and a television (TV) 110 which are connected to one another via an Ethernet 120.

The first server 130 has UPnP capability. The first server 130 provides the TV 110, which is connected to the Ethernet 120, with a content list through a CDS upon the request of the TV 110.

The second server 140 also has UPnP capability. The second server 140 provides the TV 110 with a content list through a CDS upon the request of the TV 110.

The TV 110 acts as a UPnP CP. The TV 110 provides a user with the content list provided by the first server 130 or the content list provided by the second server 140 via the Ethernet 120. The TV 110 includes a graphic user interface (GUI) which displays a content list on a screen. The TV 110 issues a request for a content list to the first server 130 or the second server 140 and maps a content list received from the first server 130 or the second server 140 to a plurality of empty channels (e.g., channels 3, 5, 7 and 8 illustrated in FIG. 3C). Thereafter, when one of the channels to which the received content list has been mapped is selected by the user with the aid of a select button, the TV 110 readily plays back a content file corresponding to the selected channel.

Figure 2:
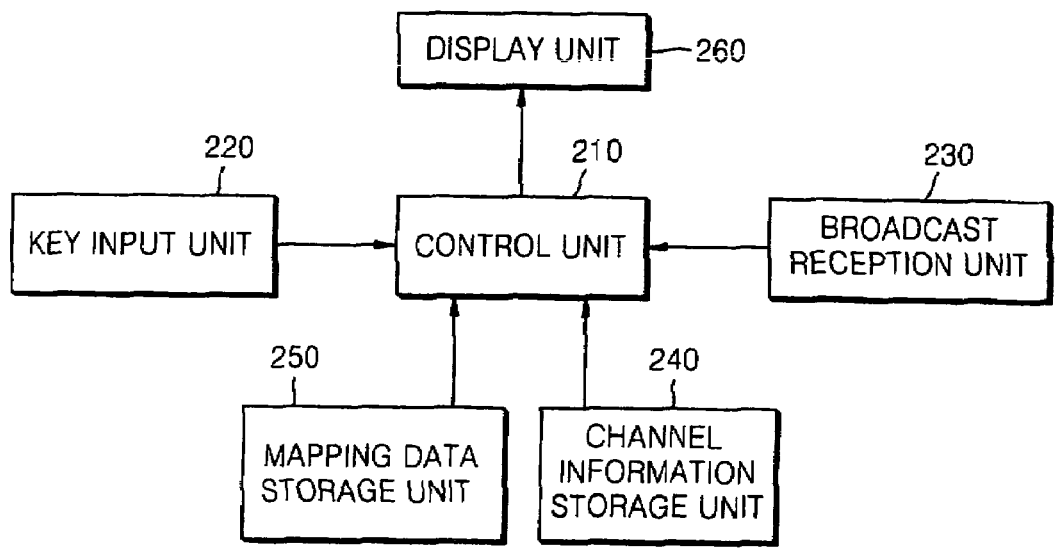
FIG. 2 is a block diagram of a television illustrated in FIG. 1 according to an exemplary embodiment of the present invention.

FIG. 2 is a block diagram of a content processing apparatus of the TV 110 illustrated in FIG. 1 according to an exemplary embodiment of the present invention. Referring to FIG. 2, a key input unit 220 receives a channel up/down signal or a playback button signal, and then selects a channel or plays back a content file.

A channel information storage unit 240 stores a plurality of channel numbers corresponding to a plurality of channels having a broadcast signal (hereinafter referred to as "broadcast channels"), respectively, and a plurality of channel numbers corresponding to a plurality of channels having no broadcast signal (hereinafter referred to as "empty channels"), respectively, using automatic channel setting.

A mapping data storage unit 250 stores mapping information regarding the mapping relationship between a content list and a plurality of channels.

A broadcast reception unit 230 receives and tunes a broadcast signal selected by the key input unit 220.

A control unit 210 issues a request for a content list to a plurality of server devices in a home network and maps a received content list to a plurality of empty channels. When one of the channels to which the received content list has been mapped, is selected, the control unit 210 plays back content corresponding to the selected channel.

A display unit 260 displays a content list or content played back by the control unit 210.

Figure 3A:
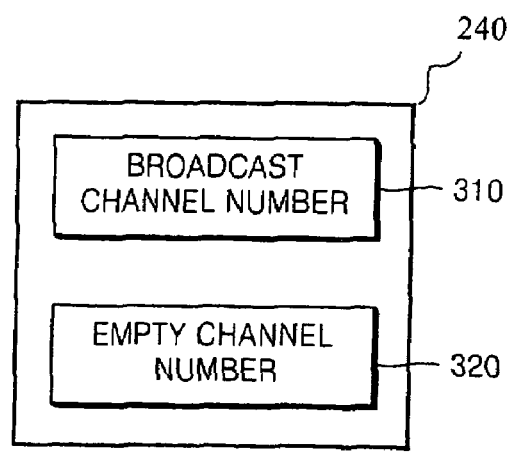
FIG. 3A is a block diagram of a channel information storage unit illustrated in FIG. 2.

FIG. 3A is a detailed block diagram of the channel information storage unit 240 illustrated in FIG. 2 according to an exemplary embodiment of the present invention. Referring to FIG. 3A, the channel information storage unit 240 may store a broadcast channel number 310 which corresponds to a broadcast channel and an empty channel number 320 which corresponds to an empty channel. Referring to FIG. 3C, examples of the empty channel number 320 include channels 3, 5, 7, and 8, and examples of the broadcast channel number 310 include channels 4, 6 and 9.

Figure 3B:
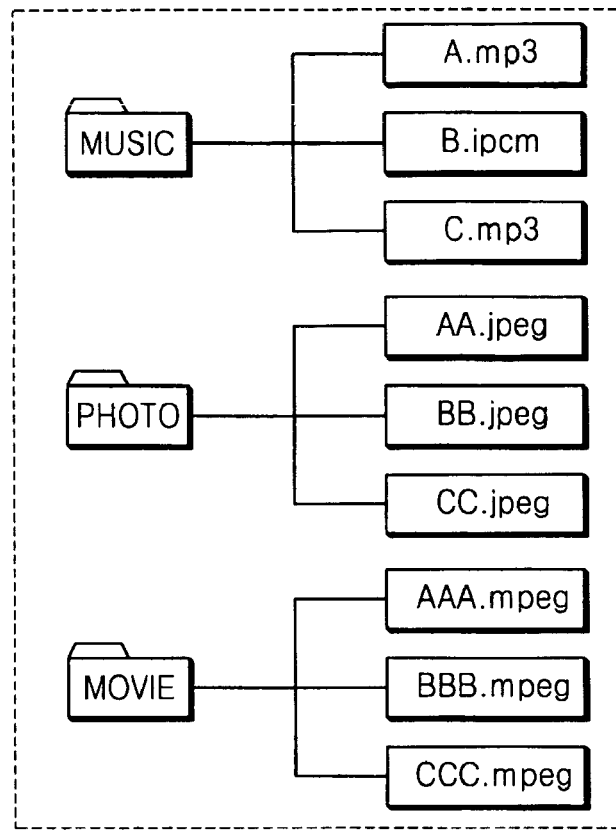
FIG. 3B is a diagram illustrating a content list provided by a server through a content directory service CDS according to an exemplary embodiment of the present invention.
Figure 3C:
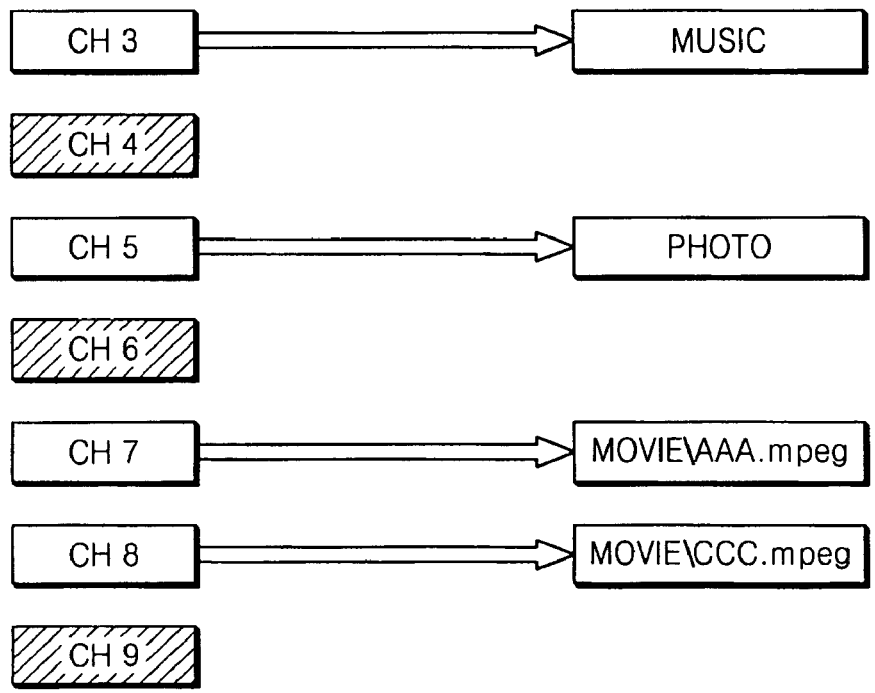
FIG. 3C is a diagram for explaining a method of mapping a content list to a plurality of empty channels according to an exemplary embodiment of the present invention.

FIG. 3B is a diagram illustrating a content list which can be provided through a CDS by a server according to an exemplary embodiment of the present invention. Referring to FIG. 3B, a server having UPnP capability can provide a content list through a CDS. A server root directory "MUSIC" of the content list includes a plurality of contents; "A.mp3", "B.ipcm", and "C.mp3". A server root directory "PHOTO" of the content list includes a plurality of contents; "AA.jpeg", "BB.jpeg", and "CC.jpeg". A server root directory "MOVIE" of the content list includes a plurality of contents; "AAA.mpeg", "BBB.mpeg", and "CCC.mpeg".

FIG. 3C is a diagram for explaining a method for mapping a content list to a plurality of empty channels according to an exemplary embodiment of the present invention. Referring to FIG. 3C, channels 4, 6, and 9 are broadcast channels, and channels 3, 5, 7, and 8 are empty channels. Therefore, the server root directory "MUSIC" illustrated in FIG. 3B can be mapped to channel 3, the server root directory "PHOTO" illustrated in FIG. 3B can be mapped to channel 5, the content "AAA.mpeg" included in the server root directory "MOVIE" illustrated in FIG. 3B can be mapped to channel 7, and the content "CCC.mpeg" included in the server root directory "MOVIE" can be mapped to channel 8. Mapping information regarding all the results of the mapping is stored in the mapping data storage unit 250.

Figure 4:
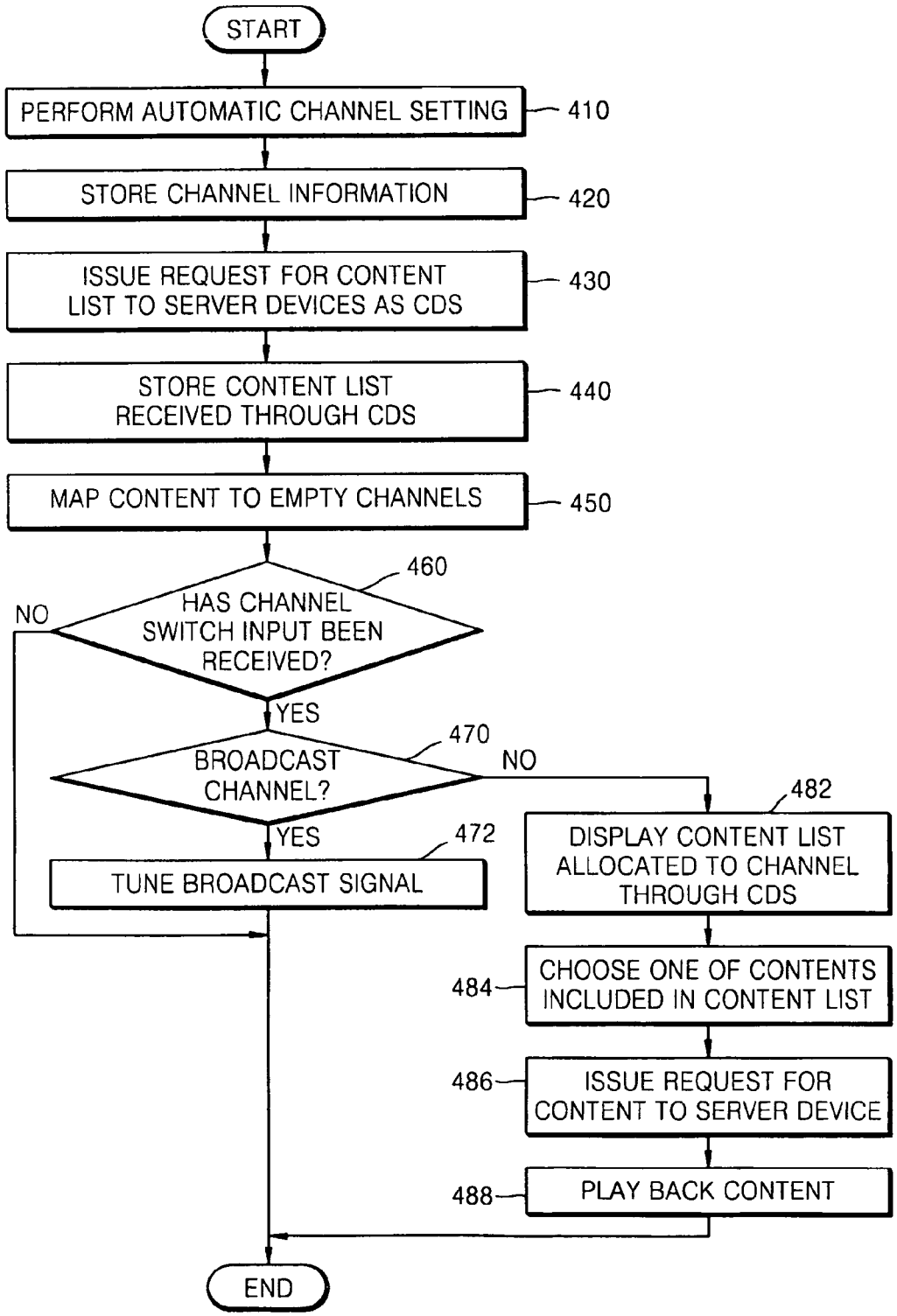
FIG. 4 is a flowchart illustrating a content processing method for processing content in a home network using TV channels according to an exemplary embodiment of the present invention.

FIG. 4 is a flowchart illustrating a content processing method for processing a content in a home network using TV channels according to an exemplary embodiment of the present invention. Referring to FIG. 4, in operation 410, a TV is turned on and the TV performs an automatic channel setting operation. The automatic channel setting operation is an algorithm used to search through a plurality of channels and respectively set some of the plurality of broadcast channels to a plurality of channel numbers. In detail, the automatic channel setting function is an algorithm in which it is sequentially determined whether the plurality of channels are broadcast channels using a synchronization signal, and only those of the plurality of channels which are determined to be broadcast channels are respectively mapped to a plurality of channel numbers. In short, the TV can detect a plurality of broadcast channels and a plurality of empty channels using the automatic channel setting function. Thereafter, in operation 420, the TV stores the broadcast channels and a plurality of channel numbers corresponding to the broadcast channels, respectively, and the TV stores the empty channels and a plurality of channel numbers corresponding to the empty channels, respectively. For example, the TV may store channels 3, 5, 7, and 8 as empty channels and channels 4, 6, and 9 as broadcast channels.

In operation 430, the TV issues a request for a content list to one of a plurality of servers having UPnP capability. Such content may include uniform resource locator (URL) information. The servers having UPnP capability can provide a content list to the TV through a CDS. An example of the content list that can be provided through a CDS is illustrated in FIG. 3B, as discussed above.

In operation 440, the TV stores a content list received through a CDS in a predetermined region of memory.

In operation 450, the TV maps the received content list to a plurality of empty channel numbers. In other words, the TV maps URL information of content provided by a server in a home network to a predetermined channel. An example of a method for mapping a content list to a plurality of empty channels is illustrated in FIG. 3C, as discussed above. The TV may map an entire directory including a plurality of contents provided by a server in a home network to an empty channel or map only one of the contents to an empty channel. For example, referring to FIG. 3C, the TV may map the server root directory "MUSIC" to channel 3, the server root directory "PHOTO" to channel 5, the content "AAA.mpeg" included in the server root directory "MOVIE" to channel 7, and the content "CCC.mpeg" included in the server root directory "MOVIE" to channel 8.

In operation 460, the TV determines whether a channel switch button signal has been received. In operation 470, if a channel switch button signal has been received, the TV determines whether a channel corresponding to the channel switch button signal is a broadcast channel. In operation 472, if the channel corresponding to the channel switch button signal is a broadcast channel, the TV tunes a broadcast signal included in the channel corresponding to the channel switch button signal. For example, if channel 6 is selected, the TV displays a broadcast signal included in channel 6 on a screen.

In operation 482, if the channel corresponding to the channel switch button signal is not a broadcast channel, the TV displays a content list that is mapped to the channel corresponding to the channel switch button signal on the screen. In operation 484, one of a plurality of contents in the content list displayed on the screen is selected. In operation 486, the TV issues a request for the selected content to a server, which provides the content list displayed on the screen. In operation 488, the TV receives the requested content through a CDS and plays back the received content. Alternatively, if a channel to which only one content is mapped is selected, the TV can readily play back the content included in the selected channel. For example, if channel 5 is selected, the TV can display a content list including all the photo files included in the server root directory "PHOTO". On the other hand, if channel 7 is selected, the TV can readily play back the content "AAA.mpeg" included in the server root directory "MOVIE".

If the TV is switched from one channel to another channel while playing back a moving image, the playback of the moving image is temporarily stopped. Thereafter, if the channel to which the moving image is mapped is selected again, the TV resumes the playback of the moving image.

The present invention can be realized as computer-readable code written on a computer-readable recording medium. The computer-readable recording medium may be any type of recording device in which data is stored in a computer-readable manner. Examples of the computer-readable recording medium include, but are not limited to, a ROM, a RAM, a CD-ROM, a magnetic tape, a floppy disc, and an optical data storage. The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, a plurality of network contents are respectively allocated to a plurality of empty channels. Therefore, users who are unfamiliar with the use of a home network user interface (UI) such as minors and seniors can easily play back a desired content file by switching channels. In addition, content can be readily played back as soon as a channel corresponding to the content is selected. Therefore, it is possible to play back content more conveniently and quickly than in a conventional menu-based content processing method.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A content processing method comprising:
   detecting a plurality of empty channels to which no external service provider content has been allocated and a plurality of allocated channels to which external service provider content has been allocated, using an automatic channel setting function, the external service provider being external to a home network;
   storing first channel information regarding the plurality of allocated channels to which external service provider content has been allocated;
   storing second channel information regarding the plurality of empty channels to which no external service provider content has been allocated;
   issuing a request for a home network content list to one of a plurality of server devices connected to the home network;
   receiving the home network content list from the one of the plurality of server devices;
   automatically mapping home network content sources from the home network content list of the one of the plurality of server devices to the plurality of empty channels in response to receiving the home network content list;
   selecting one of the plurality of empty channels to which the home network content sources from the home network content list are mapped, and displaying on a display unit a list of contents available from a respective one of the home network content sources that is mapped to the selected empty channel; and
   choosing one of the contents included in the displayed list of contents and playing back the chosen one of the contents.

2. The content processing method of claim 1, wherein the first channel information and the second channel information are stored by the automatic channel setting function.

3. The content processing method of claim 1, wherein the mapping comprises mapping Uniform Resource Locator information to at least one of the plurality of empty channels.

4. The content processing method of claim 1, wherein the mapping comprises mapping an entire group of content files provided by a server device in the home network to at least one of the plurality of empty channels.

5. The content processing method of claim 1, wherein the mapping comprises mapping a content file provided by a server device in the home network to at least one of the plurality of empty channels.

6. The content processing method of claim 1, wherein the selecting comprises:
   if a channel switch request is received, then tuning to one of the plurality of empty channels with reference to the second channel information; and
   selecting content with reference to channel information regarding channels to which the home network content sources from the home network content list are mapped.

7. The content processing method of claim 1, wherein the displaying comprises:
   if one of the plurality of empty channels to which the home network content sources from the home network content list are mapped is selected, then displaying a list of contents allocated to the selected empty channel;
   if one of the listed contents is selected, then issuing a request for the selected content to a server device which provides the selected content and receiving the requested content; and
   displaying the received content.

8. The content processing method of claim 1, wherein the chosen one of the contents comprises a video;
   wherein if channel switching occurs while playing back the video, then playback of the video is temporarily stopped; and wherein if the selected empty channel, to which the home network content list is mapped, is thereafter selected again, then playback of the video is resumed.

9. A content processing apparatus for processing a plurality of contents provided by a plurality of devices in a home network, the content processing apparatus comprising:
- a channel detection unit which detects a plurality of empty channels having no external service provider content allocated thereto and a plurality of allocated channels having external service provider content allocated thereto, using an automatic channel setting function, the external service provider being external to the home network;
- a channel storage unit which stores information regarding the plurality of broadcast channels having external service provider content allocated thereto and information regarding the plurality of empty channels having no external service provider content allocated thereto, by the automatic channel setting function;
- a mapping data storage unit which stores mapping information regarding a mapping relationship between a home network content list and the plurality of empty channels; and
- a control unit which issues a request for the home network content list to, and receives the home network content list from, one of a plurality of server devices in the home network,
- wherein the control unit is configured to automatically map home network content sources from the received home network content list of the one of the plurality of server devices to the plurality of empty channels whose information is stored in the channel storage unit, in response to receiving the home network content list,
- wherein if one of the plurality of empty channels to which the home network content sources from the received home network content list are mapped is selected, then the control unit causes a list of contents available from a respective one of the home network content sources that is mapped to the selected empty channel to be displayed on a display unit, and
- wherein if one of the contents included in the displayed list of contents is chosen, then the control unit causes the chosen one of the contents to be played back.

10. The content processing apparatus of claim 9 further comprising a display unit which, if one of the plurality of empty channels to which the home network content sources from the received home network content list are mapped is selected, then displays the list of contents corresponding to the selected empty channel.

11. The content processing apparatus of claim 9, wherein the control unit is configured to automatically map home network content sources from the received home network content list of the one of the plurality of server devices to the plurality of empty channels whose information is stored in the channel storage unit without manually selecting the mapped home network content sources from a menu screen.

12. A non-transitory computer-readable recording medium storing a computer program for executing a content processing method comprising:
- detecting a plurality of empty channels to which no external service provider content has been allocated and a plurality of allocated channels to which external service provider content has been allocated using an automatic channel setting function, the external service provider being external to a home network;
- storing first channel information regarding the plurality of allocated channels to which external service provider content has been allocated;
- storing second channel information regarding the plurality of empty channels to which no external service provider content has been allocated;
- issuing a request for a home network content list from one of a plurality of server devices connected to the home network;
- receiving the home network content list from the one of the plurality of server devices;
- automatically mapping home network content sources from the home network content list of the one of the plurality of server devices to the plurality of empty channels, in response to receiving the home network content list;
- selecting one of the plurality of the plurality of empty channels to which the home network content sources from the home network content list are mapped, and displaying on a display unit a list of contents available from a respective one of the home network content sources that is mapped to the selected empty channel; and
- choosing one of the contents included in the displayed list of contents and playing back the chosen one of the contents.

13. The content processing method of claim 1, wherein the automatically mapping comprises mapping home network content sources from the home network content list of the one of the plurality of server devices to the plurality of empty channels without manually selecting the mapped home network content sources from a menu screen.

14. The non-transitory computer-readable recording medium of claim 12, wherein the automatically mapping comprises mapping home network content sources from the home network content list of the one of the plurality of server devices to the plurality of empty channels without manually selecting the mapped home network content sources from a menu screen.

* * * * *